(12) United States Patent
Liu et al.

(10) Patent No.: US 11,809,717 B2
(45) Date of Patent: Nov. 7, 2023

(54) DATA MANAGING METHOD, AN ELECTRIC DEVICE, AND A COMPUTER PROGRAM PRODUCT FOR EFFICIENT MANAGEMENT OF SERVICES

(71) Applicant: EMC IP Holding Company LLC, Hopkinton, MA (US)

(72) Inventors: Weiyang Liu, Shanghai (CN); Lihui Su, Shanghai (CN); Min Liu, Shanghai (CN); Qi Wang, Shanghai (CN); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 15 days.

(21) Appl. No.: 17/236,756

(22) Filed: Apr. 21, 2021

(65) Prior Publication Data

US 2022/0236889 A1     Jul. 28, 2022

(30) Foreign Application Priority Data

Jan. 22, 2021   (CN) .......................... 202110087417.6

(51) Int. Cl.
*G06F 3/06* (2006.01)

(52) U.S. Cl.
CPC .......... *G06F 3/0619* (2013.01); *G06F 3/0604* (2013.01); *G06F 3/067* (2013.01); *G06F 3/0659* (2013.01); *G06F 3/0664* (2013.01); *G06F 3/0683* (2013.01)

(58) Field of Classification Search
CPC .... G06F 3/0619; G06F 3/0604; G06F 3/0659; G06F 3/067; G06F 3/0664
See application file for complete search history.

(56) References Cited

U.S. PATENT DOCUMENTS

| | | | |
|---|---|---|---|
| 2009/0037655 A1* | 2/2009 | Cherian | G06F 3/0608 711/E12.002 |
| 2013/0117337 A1* | 5/2013 | Dunham | G06F 16/182 707/827 |
| 2017/0017401 A1* | 1/2017 | Grube | G06F 3/0685 |
| 2018/0032399 A1* | 2/2018 | Johnson | G06F 11/142 |
| 2018/0356992 A1* | 12/2018 | Lamberts | G06F 3/0658 |
| 2021/0011811 A1* | 1/2021 | Balcha | G06F 11/1464 |

* cited by examiner

*Primary Examiner* — Mark A Giardino, Jr.
(74) *Attorney, Agent, or Firm* — Chamberlain, Hrdlicka, White, Williams & Aughtry (57) ABSTRACT

A method, an electronic device, and a computer program product for data management is disclosed. The method includes receiving a request for performing, on data, a first management operation related to a first storage device, the request indicating a type of the data. The method further includes determining a first service associated with the type of the data and enabling the first service to perform the first management operation on the data. Thus, resource consumption of a data manager at runtime may be substantially reduced, which saves resources to reduce operating cost of the data manager, and improves the user experience of users who use the data manager.

15 Claims, 4 Drawing Sheets

DATA MANAGING METHOD, AN ELECTRIC DEVICE, AND A COMPUTER PROGRAM PRODUCT FOR EFFICIENT MANAGEMENT OF SERVICES

CROSS REFERENCE TO RELATED APPLICATION

This application claims priority under 35 U.S.C. § 119 to Chinese Patent Application No. 202110087417.6, filed on Jan. 22, 2021. The contents of Chinese Patent Application No. 202110087417.6 are incorporated by reference in its entirety.

TECHNICAL FIELD

Embodiments of the present disclosure generally relate to the field of data management, and particularly, to a method, an electronic device, and a computer program product for data management.

BACKGROUND

With the continuous development of computing technologies, both individuals and enterprises store large amounts of data on their physical or virtual computers, servers, and other storage devices. If the data is not managed and protected reasonably and effectively, when the data can no longer be used due to, for example, a failure of a storage medium thereof or an error of the data itself, a loss of the data may be caused, thereby bringing huge losses. Therefore, a large number of data management products are designed, developed, and used to manage and protect data accordingly. These data management products support ensuring secure storage of a copy of the data by pre-saving the data in multiple forms in multiple locations based on specific requirements of a data owner, so that when the data can no longer be used because the data on a storage medium is lost or the storage medium itself fails, the data may be recovered from the saved copy.

The data management products usually support saving copies of data and recovering data from the copies by way of providing various services associated with data management. However, in a conventional data management product, all services will be enabled at the same time as the data management product is enabled, so that corresponding services may be used directly when management operations need to be performed on data. Since keeping the services enabled requires the consumption of computing resources and storage resources, even when a large number or even all of the services in the data management product are not used, the data management product still consumes a large amount of computing resources and storage resources, which not only causes a waste of resources and increases operating cost of the data management product, but also reduces user experience of users of the data management product.

SUMMARY OF THE INVENTION

Embodiments of the present disclosure provide a method, an electronic device, and a computer program product for data management.

In a first aspect of the present disclosure, a method for data management is provided. The method includes: receiving a request for performing, on data, a first management operation related to a first storage device, the request indicating a type of the data; determining a first service associated with the type of the data; and enabling the first service to perform the first management operation on the data.

In a second aspect of the present disclosure, an electronic device is provided. The electronic device includes: at least one processing unit; and at least one memory that is coupled to the at least one processing unit and stores instructions for execution by the at least one processing unit, the instructions, when executed by the at least one processing unit, causing the device to perform actions, and the actions including: receiving a request for performing, on data, a first management operation related to a first storage device, the request indicating a type of the data; determining a first service associated with the type of the data; and enabling the first service to perform the first management operation on the data.

In a third aspect of the present disclosure, a computer program product is provided. The computer program product is tangibly stored on a non-transitory computer-readable medium and includes machine-executable instructions. The machine-executable instructions, when executed, cause a machine to perform any step of the method described according to the first aspect of the present disclosure.

The Summary of the Invention section is provided to introduce selection of concepts in a simplified form, which will be further described in the Detailed Description below. The Summary of the Invention section is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Hereinafter, preferred embodiments of the present disclosure will be described in more detail with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based" on means "based at least in part on." The terms "an example embodiment" and "an embodiment" mean "at least one embodiment." The term "another embodiment" means "at least one further embodiment." The terms "first," "second," and the like may refer to different or the same objects. Other explicit and implicit definitions may also be included below.

In a conventional data management product, all services will be enabled at the same time as the data management product is enabled, so that corresponding services may be used directly when management operations need to be performed on data. It can be seen that the services in the conventional data management product are not enabled on demand, and neither a provider nor a user of the data management product can enable or disable a service for the data management operations to be performed. However, keeping these services enabled consumes a large amount of computing resources and storage resources. For example, when a conventional data management product is enabled and remains running, even if this data management product does not perform any data management operation, services that remain enabled will occupy up to 18 GB of a memory space. Therefore, for the conventional data management product, even if a large number or even all of the services are not used, they will still consume a large amount of computing resources and storage resources, which not only causes a waste of resources and increases operating cost of the data management product, but also reduces user experience of users of the data management product.

In order to at least partially solve the above problems and one or more of other potential problems, the embodiments of the present disclosure propose a data management solution. In the method for data management according to embodiments of the present disclosure, since data manager 110 enables an associated service only after receiving a request for performing, on data 0, management operations related to a storage device, it is possible to avoid pre-enabling the service for a long time when unnecessary, so that processing resources and storage resources consumed by the data manager may be saved.

Figure 1:
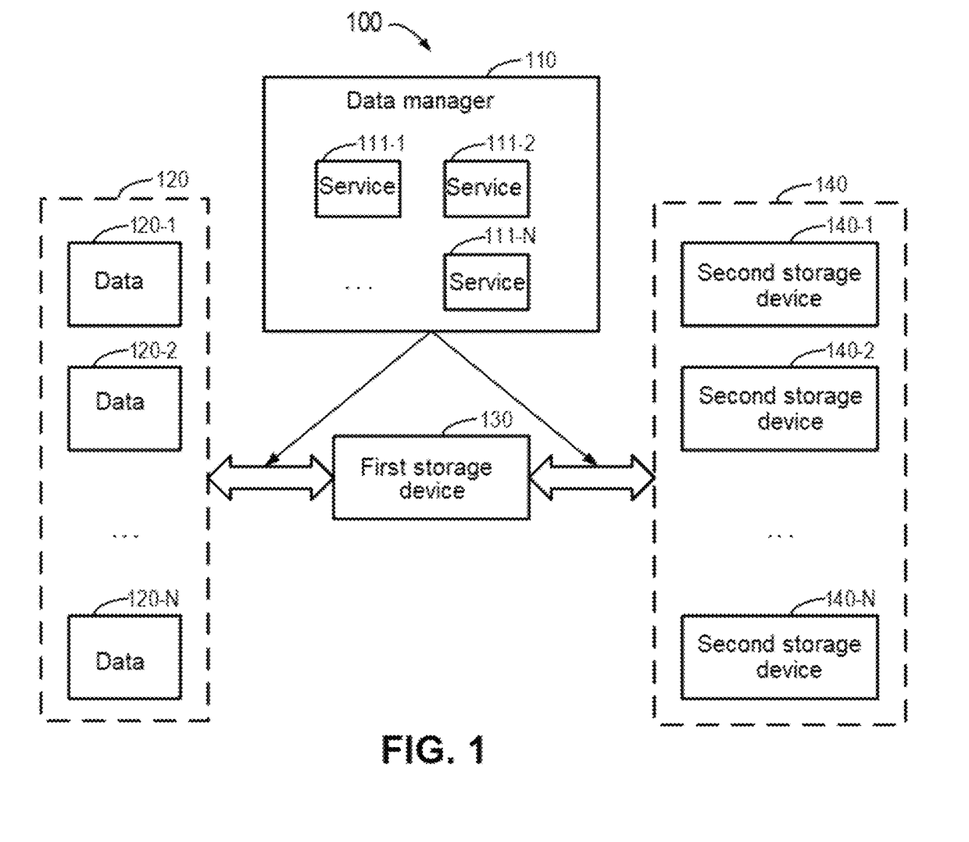
FIG. 1 shows a schematic diagram of example environment 100 in which a device and/or a method according to one or more embodiments disclosed herein.

FIG. 1 shows a schematic diagram of example environment 100 in which a device and/or a method according to one or more embodiments may be implemented. According to one or more embodiments, example environment 100 in FIG. 1 includes data manager 110. Data manager 110 can provide a plurality of services 111-1, 111-2, . . . , 111-N, which are also collectively referred to as services 111 below. In environment 100 of FIG. 1, a plurality of data 120-1, 120-2, . . . , 120-N are shown, which are collectively referred to as data 120. In environment 100 of FIG. 1, a plurality of second storage devices 140-1, 140-2, . . . , 140-N are also shown, which are collectively referred to as second storage device 140. It should be understood that although data manager 110, data 120, first storage device 130, and second storage device 140 are illustrated as separate units in FIG. 1, part or all of these units may also be integrated together depending on different implementation architectures. For example, data manager 110, first storage device 130, and second storage device 140 may be integrated together as a new data management system. Therefore, the protection scope of the present disclosure is not limited to example environment 100 shown in FIG. 1.

Services 111 may include services for different types of data 120, respectively. According to one or more embodiments, data 120 may include data that is owned and used by an enterprise or an individual, and data 120 may also be referred to as a data asset. Data 120 includes, for example, application data, virtual machine data, storage device data, container data, and the like. The application data may, for example, include SQL server application data, ORACLE application data, and file system application data, and the container data may, for example, include KUBERNETES container data.

Accordingly, services 111 may include an application data management service ADM for application data, a virtual machine data management service VMDM for virtual machine data, a storage device data management service SDM for storage device data, and a container data management service CNDM for container data. These services for different types of data 120 may be collectively referred to as a first service in the present disclosure, and may be used to cause data 120 to be backed up to first storage device 130 or to cause data 120 to be recovered from first storage device 130. In one or more embodiments, backing up data 120 to first storage device 130 or recovering data 120 from first storage device 130 may be referred to as a first management operation. First storage device 130 may also be referred to as a primary storage device.

Services 111 may further include a service used to cause data 120 backed up in first storage device 130 to be further backed up to second storage device 140 or to be recovered from second storage device 140 to first storage device 130. In one or more embodiments, further backing up data 120 backed up in first storage device 130 to second storage device 140 or recovering data 120 from second storage device 140 to first storage device 130 may be referred to as a second management operation. The second management operation is related to second storage device 140 and a further form of data management to be performed on data 120 backed up in first storage device 130.

For example, the second management operation may include management operations for data 120, such as backup, replication, recovery, cloud storage for long-term retention, and cloud disaster recovery, provided based on data management requirements of an enterprise or individual. These management operations may be implemented by enabling services 111 included in data manager 110. Services 111 may be microservices, which may exist independently as separate modules in data manager 110, and are also easy to add, modify, or delete in data manager 110.

For example, when it is desired to cause data 120 backed up in first storage device 130 to be further backed up to second storage device 140 such as a replication storage device or to be recovered from the replication storage device, services 111 may include a replication management service REPLMGR; when it is desired to cause data 120 backed up in first storage device 130 to be further backed up to second storage device 140 such as a cloud storage device or to be recovered from the cloud storage device, services 111 may include a cloud management service CLOUDMGR; and when it is desired to cause data 120 backed up in first storage device 130 to be further backed up to second storage device 140 such as a cloud disaster recovery storage device or to be recovered from the cloud disaster recovery storage device, services 111 may include a cloud disaster recovery management service CLOUDDR.

In FIG. 1, a two-way arrow between data 120 and first storage device 130 represents a first management operation that may cause data 120 to be backed up to first storage device 130 or recovered from first storage device 130, and a one-way arrow pointing from data manager 110 to the two-way arrow represents that the first management operation is implemented through services 111 in data manager 110. Moreover, a two-way arrow between first storage device 130 and second storage device 140 represents a second management operation that may cause data 120 backed up to first storage device 130 to be further backed up to second storage device 140 or recovered from second storage device 140, and a one-way arrow pointing from data manager 110 to the two-way arrow represents that the second management operation is implemented through services 111 in data manager 110.

In one or more embodiments, the description is given by taking data manager 110 as an example, and data manager 110 may include any physical or virtual central processing unit, dedicated processing unit, dedicated accelerator, and the like. However, the protection scope of the present disclosure is not limited thereto, but may be applied to various computing elements, units, modules, or systems that can provide input and output processing capabilities.

It should be understood that example environment 100 is only illustrative and not restrictive, and is extensible or shrinkable. For example, example environment 100 may include more data managers 110, more data 120, more first storage devices 130, and more second storage devices 140, so that a requirement that more users use more data managers 110, more first storage devices 130, and more second storage devices 140 at the same time to protect more data may be satisfied. In addition, example environment 100 may also include only the first storage device 130 and not the second storage device 140, and at this time, the data manager 110 only uses services 111 therein to cause data 120 to be backed up to first storage device 130 or recovered from first storage device 130 without considering to cause data 120 backed up to first storage device 130 to be further backed up to second storage device 140 or to be recovered from second storage device 140.

Figure 2:
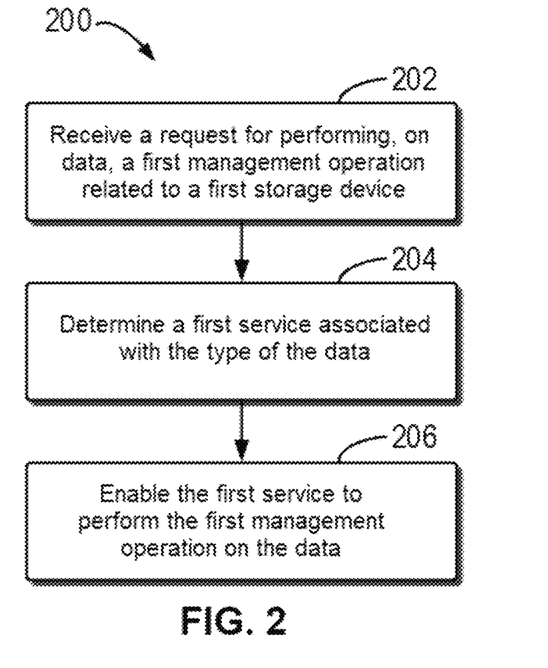
FIG. 2 shows a flowchart of method 200 for data management according to one or more embodiments disclosed herein.
Figure 3:
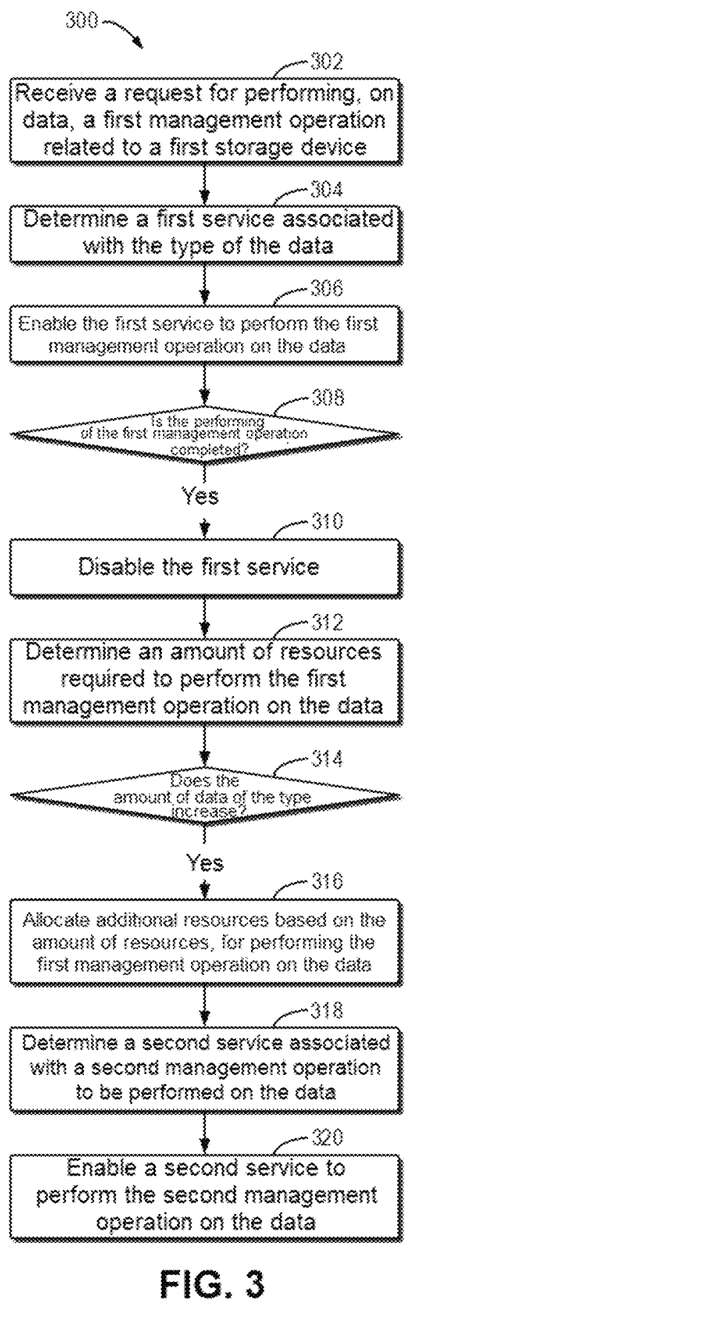
FIG. 3 shows a flowchart of method 300 for data management according to one or more embodiments disclosed herein.

The following takes data manager 110, data 120, first storage device 130, and second storage device 140 included in FIG. 1 as examples to illustrate method 200 for data management and method 300 for data management shown in FIG. 2 and FIG. 3, in accordance with one or more embodiments disclosed herein.

FIG. 2 shows a flowchart of method 200 for data management according to one or more embodiments. Method 200 may be implemented by data manager 110 shown in FIG. 1 or by other appropriate devices. It should be understood that method 200 for data management may further include additional steps not shown and/or may omit the shown steps, and the scope of the embodiments of the present disclosure is not limited in this respect.

At block 202, data manager 110 receives a request for performing, on data 120, a first management operation related to first storage device 130. According to an embodiment of the present disclosure, the aforementioned request may be a management policy sent to data manager 110 by, for example, an enterprise or an individual, for indicating a management operation desired to be performed on data 120 that is owned and used. Therefore, this request may indicate the type of data 120 on which the management operation is desired to be performed. According to an embodiment of the present disclosure, the type of data 120 may include, for example, application data, virtual machine data, storage device data, and container data. Therefore, the aforementioned request may indicate that the type of data 120 is application data, virtual machine data, storage device data, or container data. For example, the management policy may directly indicate the type of data 120, first storage device 130, and a first management operation, including a backup operation or a recover operation that is desired to be performed on data 120. According to one or more embodiments, because only one first storage device 130 is included in example environment 100, the management policy may also not need to indicate first storage device 130. When a plurality of first storage devices 130 are included in example environment 100, the management policy may indicate corresponding first storage device 130 among the plurality of first storage devices 130 to perform the first management operation. In addition, in accordance with embodiments disclosed herein, the management policy may also indicate time, schedule, and number of times associated with the management operations performed on data 120, and how many levels of protection are to be adopted, such as different locations where the data is backed up.

At block 204, data manager 110 determines a first service associated with the type of data 120. According to an embodiment of the present disclosure, the first service may include, for example, an application data management service ADM for application data, a virtual machine data management service VMDM for virtual machine data, a storage device data management service SDM for storage device data, and a container data management service CNDM for container data, so that data manager 110 may determine whether the first service is the application data management service ADM, the virtual machine data management service VMDM, the storage device data management service SDM, or the container data management service CNDM based on whether the type of data 120 is application data, virtual machine data, storage device data, or container data.

At block 206, data manager 110 enables the first service to perform the first management operation on data 120. According to an embodiment of the present disclosure, the first service may be a microservice, and the first management operation may include backing up data 120 to first storage device 130 or recovering data 120 from first storage device 130.

According to an embodiment of the present disclosure, after data manager 110 enables the first service, data manager 110 may add the first service to a list of enabled services to indicate that the first service has been enabled. Therefore, before data manager 110 enables the first service, it is also possible to check the list of enabled services first to determine whether the first service has been enabled. When the first service has been enabled, data manager 110 does not need to perform an operation of enabling the first service again.

By using method 200 for data management, since data manager 110 enables an associated first service only after receiving a request for performing, on data 120, a first management operation related to first storage device 130, it is possible to avoid pre-enabling the first service for a long time when unnecessary, so that processing resources and storage resources consumed by data manager 110 may be saved.

FIG. 3 shows a flowchart of method 300 for data management according to one or more embodiments. Method 300 may also be implemented by data manager 110 shown in FIG. 1 or by other appropriate devices. It should be understood that method 300 for data management may further include additional steps not shown and/or may omit the shown steps, and the scope of the embodiments of the present disclosure is not limited in this respect. Method 300 for data management is a specific implementation of method 200 for data management in accordance with embodiments disclosed herein.

At block 302, data manager 110 receives a request for performing, on data 120, a first management operation related to first storage device 130. The specific content of an action involved in block 302 is the same as that involved in block 202, and will not be repeated here.

At block 304, data manager 110 determines a first service associated with the type of data 120. The specific content of an action involved in block 304 is the same as that involved in block 204, and will not be repeated here.

At block 306, data manager 110 enables the first service to perform the first management operation on data 120. The specific content of an action involved in block 306 is the same as that involved in block 206, and will not be repeated here.

At block 308, data manager 110 determines whether the performing of the first management operation is completed. When data manager 110 determines that the performing of the first management operation is completed, method 300 proceeds to block 310. According to one or more embodiments, data manager 110 may establish a task associated with using the first service to perform the first management operation. When data manager 110 detects that this task has been completed, data manager 110 can determine that the performing of the first management operation is completed. In addition, data manager 110 may also determine that the performing of the first management operation is completed by detecting removal of a management policy in accordance with embodiments disclosed herein.

At block 310, data manager 110 disables the first service. According to one or more embodiments, the first service is used by data manager 110 to perform the first management operation. Therefore, when the performing of the first management operation is completed, the first service may be disabled, so as to avoid causing data manager 110 to consume processing resources and storage resources because the first service remains enabled for a long time after being used.

According to one or more embodiments, after data manager 110 disables the first service, data manager 110 may remove the first service from a list of enabled services to indicate that the first service has been disabled.

At block 312, data manager 110 determines an amount of resources required to perform the first management operation on data 120. According to one or more embodiments, data manager 110 may determine the amount of resources required to perform the first management operation on data 120 based on a pre-recorded history record associated with the performing of the first management operation. For example, data manager 110 may determine that when the type of data 120 is virtual machine data, performing the first management operation on data 120 requires 1% of computing resources of a 2.4 GHz central processing unit and 10 MB of a memory space.

At block 314, data manager 110 determines whether the amount of data 120 of this type increases. When data manager 110 determines that the amount of data 120 of this type increases, method 300 proceeds to block 316. According to one or more embodiments, data manager 110 may learn in advance from enterprises or individual users the amount of data 120 desired for data management by data manager 110. Therefore, when a user's data 120 increases, data manager 110 may learn that the amount of data 120 has increased.

At block 316, data manager 110 allocates additional resources based on the amount of resources determined at block 312, for performing the first management operation on the increased amount of data 120 determined at block 314. According to one or more embodiments, data manager 110 may, for example, determine that the type of data 120 is virtual machine data, and performing the first management operation on data 120 requires 1% of computing resources of a 2.4 GHz central processing unit and 10 MB of a memory space. Moreover, data manager 110 may, for example, have determined that there are currently 100 virtual machines that may need to perform the first management operation, and a 2.4 GHz central processing unit and 1 GB of a memory space have been allocated accordingly. At this time, if data manager 110 determines at block 314 that a user adds 50 virtual machines that may need to perform the first management operation, data manager 110 may allocate a 2.4 GHz or lower frequency central processing unit and 500 MB of a memory space again, so that data manager 110 may use the two central processing units and a total of 1.5 GB of a memory space to provide the first management operation for an increased number of 150 virtual machines in total.

In accordance with one or more embodiments disclosed herein, performing the operations in blocks 312, 314, and 316 may avoid a shortage of resources when the first management operation needs to be performed on data 120. Thus, embodiments may avoid a time of waiting when it is temporarily found that resources are insufficient and additional resources must be allocated when the first management operation is performed. Embodiments may avoid a situation where the user's data 120 is lost and cannot be recovered during this time of waiting. In addition, when data manager 110 has allocated more resources for performing the first management operation on data 120, data manager 110 may also reduce the amount of resources that has been allocated based on a reduction in data on which the first management operation needs to be performed, so as to further save the amount of resources consumed by data manager 110.

It should be pointed out that the operations in blocks 312, 314, and 316 in method 300 for data management are optional operations, and method 400 for data management may not include these operations that involve allocating additional resources by determining the amount of resources required to perform the first management operation on data 120 and the increased amount of data 120. In addition, the operations in blocks 312, 314, and 316 in method 300 for data management may be performed before, after, or at the same time when the operations in other blocks are performed without affecting implementation of method 300 for data management. Therefore, the scope of the present disclosure is not limited in this respect.

At block 318, data manager 110 determines a second service associated with a second management operation to be performed on data 120. According to one or more embodiments, the request received by data manager 110 at block 302 also indicates that a second management operation related to second storage device 140 is to be performed on data 120. For example, the aforementioned request may be a management policy sent to data manager 110 by, for example, an enterprise or an individual, for indicating a management operation desired to be performed on data 120 that is owned and used. For example, the second management operation may include: further backing up data 120 backed up in first storage device 130 to second storage device 140 such as a replication storage device or recovering data 120 from the replication storage device; further backing up data 120 backed up in first storage device 130 to second storage device 140 such as a cloud storage device or recovering data 120 from the cloud storage device; and further backing up data 120 backed up in first storage device 130 to second storage device 140 such as a cloud disaster recovery storage device or recovering data 120 from the cloud disaster recovery storage device.

For another example, the second service may include: a replication management service REPLMGR that is used to cause data 120 backed up in first storage device 130 to be further backed up to second storage device 140 such as a replication storage device or to be recovered from the replication storage device, a cloud management service CLOUDMGR that is used to cause data 120 backed up in first storage device 130 to be further backed up to second storage device 140 such as a cloud storage device or to be recovered from the cloud storage device, and a cloud disaster recovery management service CLOUDDR that is used to cause data 120 backed up in first storage device 130 to be further backed up to second storage device 140 such as a cloud disaster recovery storage device or to be recovered from the cloud disaster recovery storage device.

At block 320, data manager 110 enables the second service to perform the second management operation on data 120. According to one or more embodiments, the second service may be a microservice.

According to one or more embodiments, after data manager 110 enables the second service, data manager 110 may add the second service to a list of enabled services to indicate that the second service has been enabled. Therefore, before data manager 110 enables the second service, it is also possible to check the list of enabled services first to determine whether the second service has been enabled. When the second service has been enabled, data manager 110 does not need to perform an operation of enabling the second service again. The list of enabled services for the second service may be the same as or different from the list of enabled services for the first service, and the scope of the embodiments of the present disclosure is not limited in this respect.

Moreover, data manager 110 may also disable the second service after determining that the performing of the second management operation is completed, so as to avoid causing data manager 110 to consume processing resources and storage resources because the second service remains enabled for a long time after being used. At this time, data manager 110 may determine that the performing of the second management operation is completed by detecting removal of a management policy.

According to one or more embodiments, after data manager 110 disables the second service, data manager 110 may remove the second service from a list of enabled services to indicate that the second service has been disabled.

According to one or more embodiments, the request received by data manager 110 at block 302 may indicate a plurality of second management operations related to a plurality of second storage devices 140, or the second management operations may be simultaneously related to the plurality of second storage devices 140. At this time, data manager 110 may enable a plurality of second services at the same time. For example, the management policy may directly indicate a plurality of second storage devices 140 and a backup or recovery operation associated with the plurality of second storage devices 140.

By using method 300 for data management, since data manager 110 enables an associated first service and second service only after receiving a request for performing, on data 120, a first management operation related to first storage device 130 and a second management operation related to second storage device 140, it is possible to avoid pre-enabling the first service and the second service for a long time when unnecessary, so that processing resources and storage resources consumed by data manager 110 may be saved. In addition, since data manager 110 will disable the associated first service and second service after determining that the first management operation and the second management operation are completed, it is also possible to avoid causing data manager 110 to consume processing resources and storage resources because the first service and the second service remain enabled for a long time after being used.

Related contents of example environment 100 in which a device and/or a method according to one or more embodiments, method 200 for data management according to one or more embodiments, and method 300 for data management according to one or more embodiments are described above with reference to FIG. 1 to FIG. 3. It should be understood that the above description is intended to better demonstrate the content recorded in the embodiments of the present disclosure, and is not intended to limit the present disclosure in any way.

It should be understood that the numbers of various elements and the magnitudes of physical quantities used in the embodiments and the drawings of the present disclosure are only examples, and are not intended to limit the protection scope of the embodiments of the present disclosure. The above numbers and magnitudes may be arbitrarily set as needed without affecting normal implementation of the embodiments of the present disclosure.

Through the description above with reference to FIG. 1 to FIG. 3, the technical solutions according to the embodiments of the present disclosure have many advantages over conventional solutions.

For example, by using the technical solution of the present disclosure, resource consumption of a data manager at runtime may be substantially reduced, which, therefore, not only may save resources, but also may improve user experience of users who use the data manager.

For another example, by using the technical solution of the present disclosure in accordance with embodiments herein, the amount of allocated resources may be dynamically increased as data on which management operations need to be performed increases, which may avoid a shortage of resources that occurs when the management operations are performed on the increased amount of data. Thus, embodiments may avoid a time of waiting when it is temporarily found that resources are insufficient and additional resources must be allocated when the management operations are performed, and embodiments may also avoid a situation where a user's data is lost and cannot be recovered during this time of waiting.

For another example, by using the technical solution of the present disclosure in accordance with embodiments herein, the amount of allocated resources may be dynamically reduced as data on which management operations need to be performed decreases, so that the amount of resources consumed by data manager 110 may be further reduced.

In an example, when a conventional data management product is enabled and remains running, even if this data management product does not perform any data management operation, services that remain enabled will occupy up to 18 GB of a memory space. In contrast to this, by using the technical solution of the present disclosure, because a service associated with the management operations is not pre-enabled, a memory space occupied by data manager 110 may be less than 12 GB, and when data manager 110 enables a virtual machine data management service VMDM in response to a request that is received, the memory space occupied by data manager 110 only increases by 2 GB, and the total memory space occupied thereby is still far smaller than 18 GB of the memory space occupied by the conventional data management product. It should be understood that specific examples of the foregoing memory space are only examples, and do not in any way limit the protection scope of the present disclosure.

Figure 4:
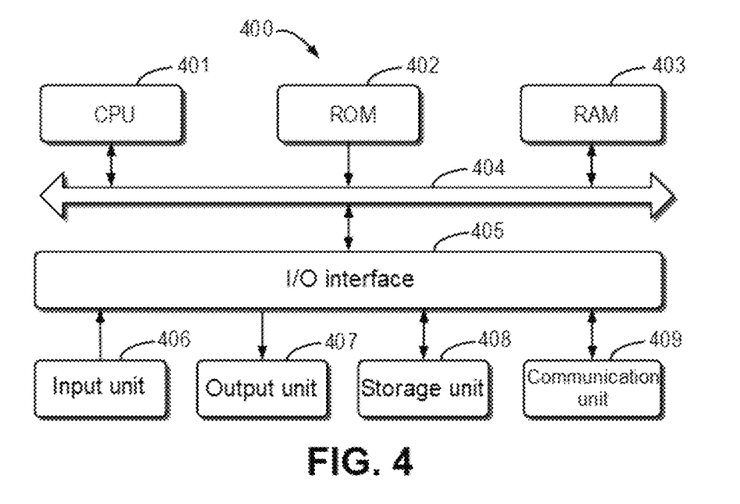
FIG. 4 shows a schematic block diagram of example device 400 that may be used to implement one or more embodiments disclosed herein.

FIG. 4 illustrates a schematic block diagram of example device 400 that may be used to implement one or more embodiments. According to one or more embodiments, data manager 110 in FIG. 1 may be implemented by device 400. As shown in the figure, device 400 includes central processing unit (CPU) 401 that may perform various appropriate actions and processing according to computer program instructions stored in read-only memory (ROM) 402 or computer program instructions loaded from storage unit 408 to random access memory (RAM) 403. In RAM 403, various programs and data required for operating device 400 may also be stored. CPU 401, ROM 402, and RAM 403 are connected to one another through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disk; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, such as methods 200 and 300, may be performed by processing unit 401. For example, in some embodiments, methods 200 and 300 may be implemented as a computer software program that is tangibly included in a machine-readable medium such as storage unit 408. In some embodiments, part or all of the computer program may be loaded and/or mounted to device 400 via ROM 402 and/or communication unit 409. One or more actions of methods 200 and 300 described above may be performed when the computer program is loaded into RAM 403 and executed by CPU 401.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage media used herein are not to be interpreted as transient signals per se, such as radio waves or other freely propagating electromagnetic waves, electromagnetic waves propagating through wave guides or other transmission media, for example, light pulses through fiber optic cables, or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer, for example, connected through the Internet by using an Internet service provider. In some embodiments, an electronic circuit, for example, a programmable logic circuit, a field programmable gate array (FPGA), or a programmable logic array (PLA), is personalized by utilizing state information of the computer-readable program instructions, where the electronic circuit may execute computer-readable program instructions so as to implement various aspects of the embodiments of the present disclosure.

Various aspects of the embodiments of the present disclosure are described here with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, so that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of the terms used herein is intended to best explain the principles and practical applications of the embodiments or technical improvements to technologies in the market, or to enable other persons of ordinary skill in the art to understand the embodiments disclosed herein.

The invention claimed is:

1. A method for data management, comprising:
   receiving a request for performing, on data, a first management operation related to a first storage device, the request indicating a type of the data;
   determining a first service associated with the type of the data, wherein the first service is a microservice;
   maintaining a list of enabled services;
   making, based on determining the first service, a first determination that the first service in not on the list of enabled services;
   enabling, after receiving the request and based on the first determination, the first service to perform the first management operation on the data and adding the first service to the list of enabled services;
   making a second determination that the first management operation is completed; and
   disabling, based on the second determination, the first service and removing the first service from the list of enabled services, wherein disabling the first service causes the first service to stop using resources.

2. The method according to claim 1, wherein the first management operation comprises at least one of the following:
   backing up the data to the first storage device; and
   recovering the data from the first storage device.

3. The method according to claim 1, wherein the type of the data indicates at least one of the following:
   the data is application data,
   the data is virtual machine data,
   the data is storage device data, or
   the data is container data.

4. The method according to claim 1, further comprising:
   determining an amount of resources required to perform the first management operation on the data; and
   if the amount of data of the type increases, allocating, based on the amount of resources, additional resources for performing the first management operation on the data.

5. The method according to claim 1, wherein the request further indicates that a second management operation related to a second storage device is to be performed on the data, the method further comprising:
   determining a second service associated with the second management operation to be performed on the data; and
   enabling the second service to perform the second management operation on the data.

6. The method according to claim 5, wherein the second management operation comprises at least one of the following:
   backing up the data from the first storage device to the second storage device; and
   recovering the data from the second storage device to the first storage device.

7. An electronic device, comprising:
   at least one processing unit; and
   at least one memory that is coupled to the at least one processing unit and stores instructions for execution by the at least one processing unit, wherein the instructions, when executed by the at least one processing unit, cause the device to perform actions, and the actions comprise:
   receiving a request for performing, on data, a first management operation related to a first storage device, the request indicating a type of the data;
   determining a first service associated with the type of the data, wherein the first service is a microservice;
   maintaining a list of enabled services;
   making, based on determining the first service, a first determination that the first service in not on the list of enabled services;
   enabling, after receiving the request and based on the first determination, the first service to perform the first management operation on the data and adding the first service to the list of enabled services;
   making a second determination that the first management operation is completed; and disabling, based on the second determination, the first service and removing the first service from the list of enabled services, wherein disabling the first service causes the first service to stop using resources.

8. The electronic device according to claim 7, wherein the first management operation comprises at least one of the following:
   backing up the data to the first storage device; and
   recovering the data from the first storage device.

9. The electronic device according to claim 7, wherein the type of the data indicates at least one of the following:
   the data is application data,
   the data is virtual machine data,
   the data is storage device data, and
   the data is container data.

10. The electronic device according to claim 7, wherein the actions further comprise:
   determining an amount of resources required to perform the first management operation on the data; and
   if the amount of data of the type increases, allocating, based on the amount of resources, additional resources for performing the first management operation on the data.

11. The electronic device according to claim 7, wherein the request further indicates that a second management operation related to a second storage device is to be performed on the data, the actions further comprise:
   determining a second service associated with the second management operation to be performed on the data; and
   enabling the second service to perform the second management operation on the data.

12. The electronic device according to claim 11, wherein the second management operation comprises at least one of the following:
   backing up the data from the first storage device to the second storage device; and
   recovering the data from the second storage device to the first storage device.

13. A non-transitory computer readable medium comprising computer readable program code, which when executed by a computer processor enables the computer processor to perform a method for data management, the method comprising:
   receiving a request for performing, on data, a first management operation related to a first storage device, the request indicating a type of the data;
   determining a first service associated with the type of the data, wherein the first service is a microservice;
   maintaining a list of enabled services;
   making, based on determining the first service, a first determination that the first service in not on the list of enabled services;
   enabling, after receiving the request and based on the first determination, the first service to perform the first management operation on the data and adding the first service to the list of enabled services;
   making a second determination that the first management operation is completed; and
   disabling, based on the second determination, the first service and removing the first service from the list of enabled services, wherein disabling the first service causes the first service to stop using resources.

14. The non-transitory computer readable medium of claim 13, the method further comprising:
   determining an amount of resources required to perform the first management operation on the data; and
   if the amount of data of the type increases, allocating, based on the amount of resources, additional resources for performing the first management operation on the data.

15. The non-transitory computer readable medium of claim 13, wherein the request further indicates that a second management operation related to a second storage device is to be performed on the data, the method further comprising:
   determining a second service associated with the second management operation to be performed on the data; and
   enabling the second service to perform the second management operation on the data.

* * * * *